United States Patent [19]
McAffee et al.

[11] Patent Number: 5,193,963
[45] Date of Patent: Mar. 16, 1993

[54] FORCE REFLECTING HAND CONTROLLER

[75] Inventors: Douglas A. McAffee, San Pedro, Calif.; Edward R. Snow, Sandy Hook, Conn.; William T. Townsend, Somerville, Mass.

[73] Assignee: The United States of America as represented by the Administrator of the National Aeronautics and Space Administration, Washington, D.C.

[21] Appl. No.: 608,658

[22] Filed: Oct. 31, 1990

[51] Int. Cl.⁵ .............................................. B25J 3/00
[52] U.S. Cl. ............................................ 414/5; 414/7
[58] Field of Search .............................. 414/5, 7, 222

[56] References Cited
U.S. PATENT DOCUMENTS

| | | |
|---|---|---|
| 2,978,118 | 4/1961 | Goertz et al. ............................ 214/1 |
| 3,631,737 | 1/1972 | Wells ...................................... 74/469 |
| 4,221,516 | 9/1980 | Haaker et al. ........................... 414/5 |
| 4,259,876 | 4/1981 | Belyanin et al. ........................ 74/469 |
| 4,392,776 | 7/1983 | Shum ..................................... 414/744 |
| 4,566,843 | 1/1986 | Iwatsuka et al. ....................... 414/680 |
| 4,805,477 | 2/1989 | Akeel ..................................... 74/479 |
| 4,883,400 | 11/1989 | Kuban et al. ........................... 414/5 |
| 4,950,116 | 8/1990 | Nishida .................................. 414/5 |

OTHER PUBLICATIONS

Johnson et al., "Teleoperators and Human Augmentation," An AEC-NASA Technology Survey, NASA SP-5047, Dec. 1967.
Bejczy et al., "Controlling Remote Manipulators Through Kinesthetic Coupling," Computers in Mechanical Enginnering, Jul. 1983, pp. 48-60.

Primary Examiner—Michael S. Huppert
Assistant Examiner—Donald W. Underwood
Attorney, Agent, or Firm—John H. Kusmiss; Thomas H. Jones; Guy M. Miller

[57] ABSTRACT

A universal input device for interfacing a human operator with a slave machine such as a robot or the like includes a plurality of serially connected mechanical links extending from a base. A handgrip is connected to the mechanical links distal from the base such that a human operator may grasp the handgrip and control the position thereof relative to the base through the mechanical links. A plurality of rotary joints is arranged to connect the mechanical links together to provide at least three translational degrees of freedom and at least three rotational degrees of freedom of motion of the handgrip relative to the base. A cable and pulley assembly for each joint is connected to a corresponding motor for transmitting forces from the slave machine to the handgrip to provide kinesthetic feedback to the operator and for producing control signals that may be transmitted from the handgrip to the slave machine. The device gives excellent kinesthetic feedback, high-fidelity force/torque feedback, a kinematically simple structure, mechanically decoupled motion in all six degrees of freedom, and zero backlash. The device also has a much larger work envelope, greater stiffness and responsiveness, smaller stowage volume, and better overlap of the human operator's range of motion than previous designs.

6 Claims, 16 Drawing Sheets

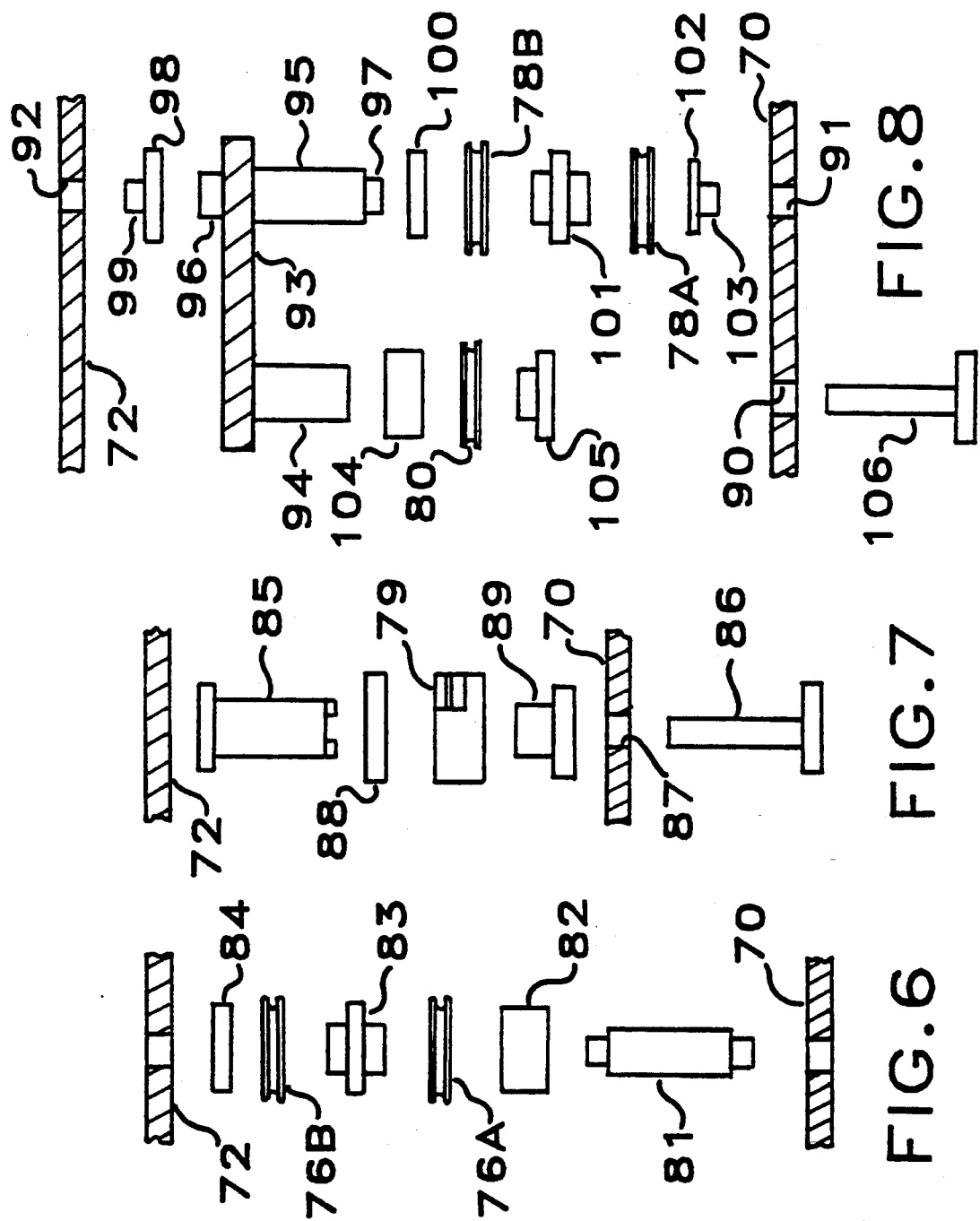

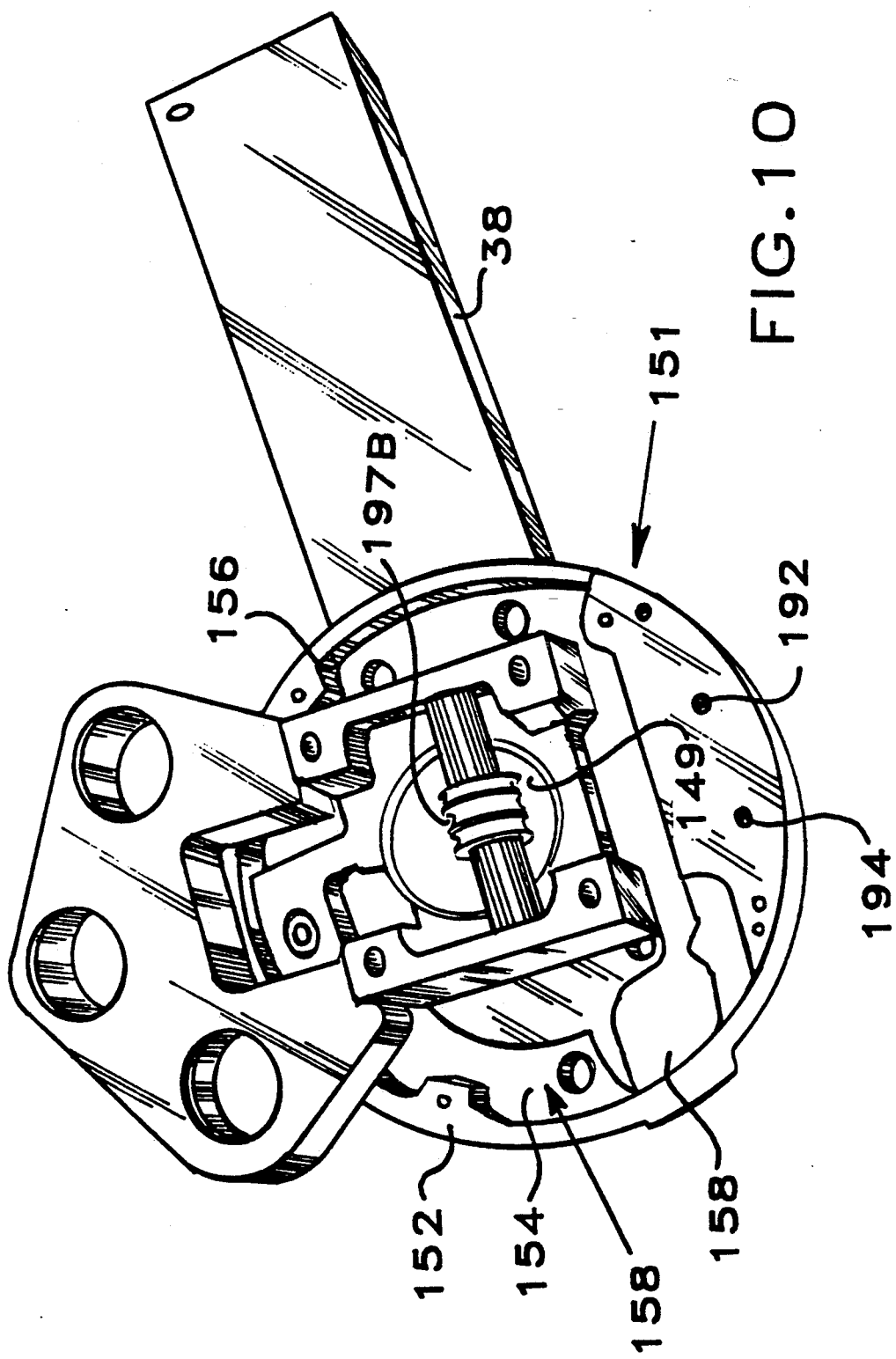

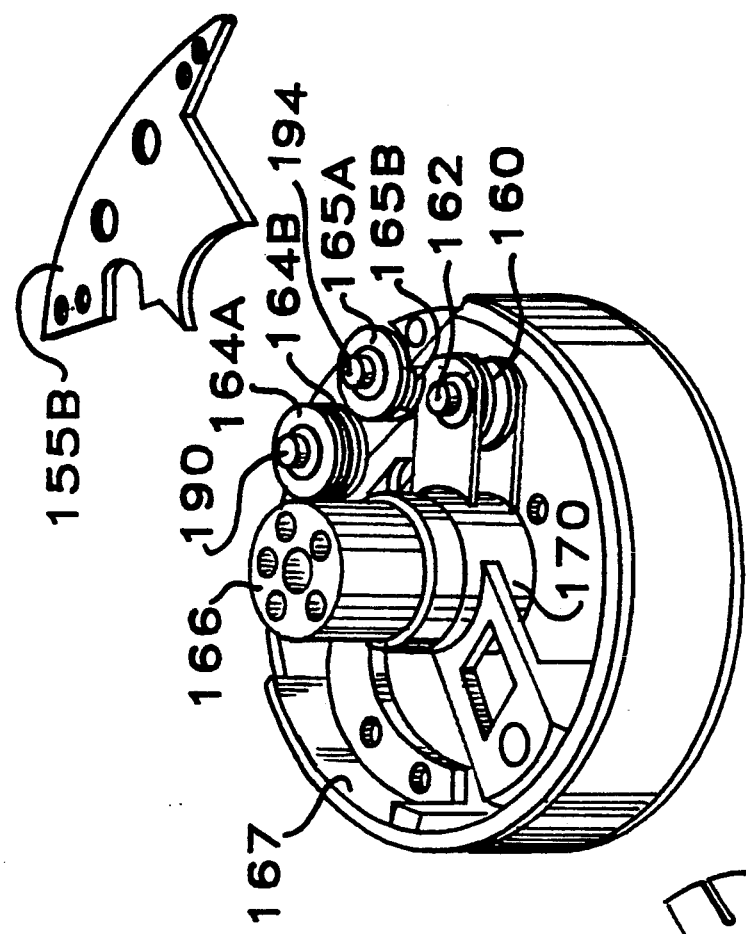
FIG. 13
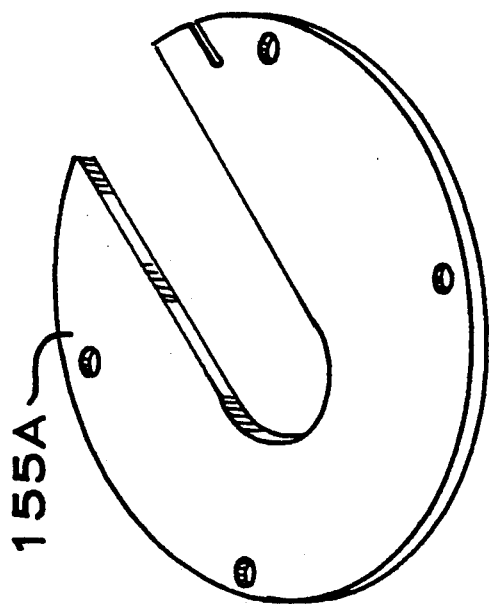

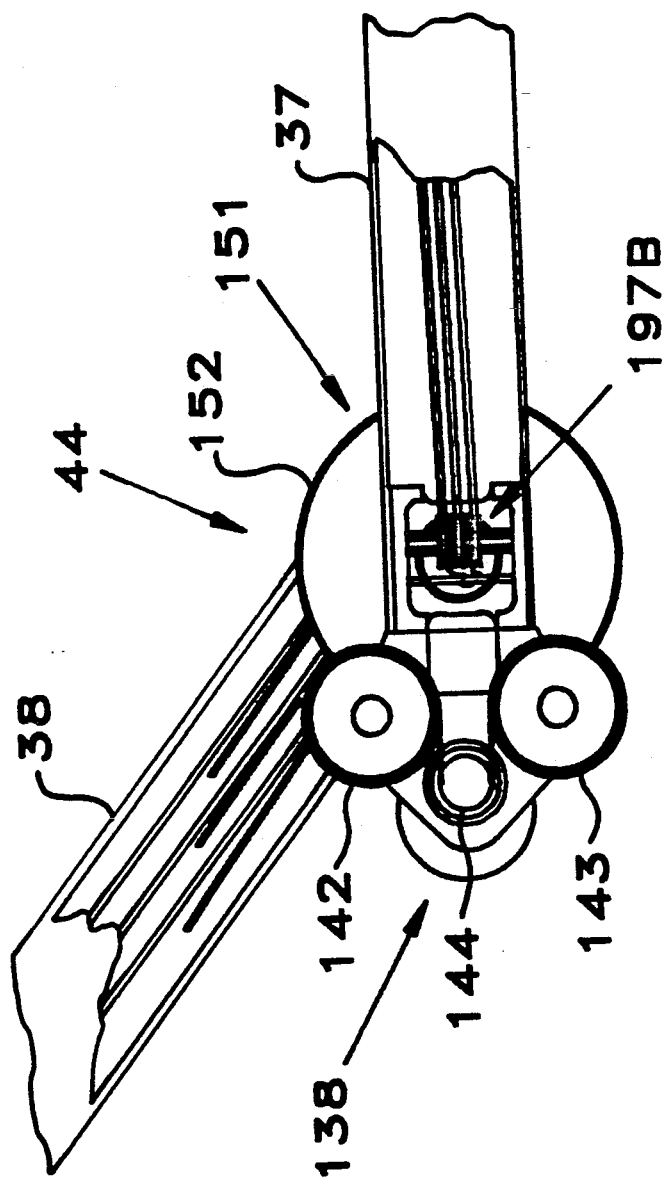

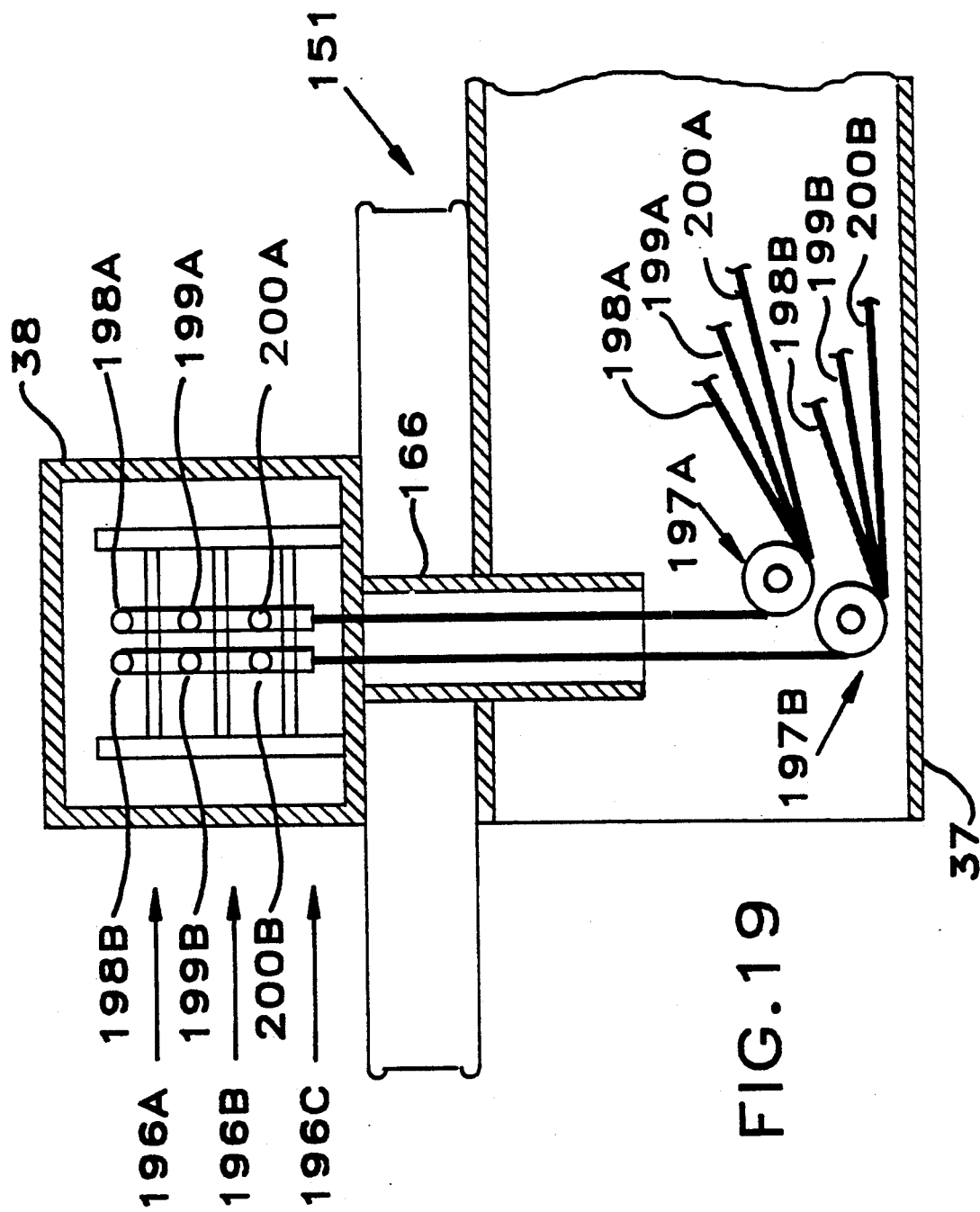

FORCE REFLECTING HAND CONTROLLER

ORIGIN OF THE INVENTION

The invention described herein was made in the performance of work under a NASA contract, and is subject to the provisions of Public Law 96-517 (35 USC 202) in which the Contractor has elected not to retain title.

BACKGROUND OF THE INVENTION

1. Technical Field

This invention relates generally to apparatus and methods for controlling robots or other similar devices. This invention relates particularly to apparatus and methods that a human operator may use for manually controlling a robot arm or other slave devices. Still more particularly, this invention relates to establishing a kinesthetic coupling between the operator and the robot by means of a manual control input device.

2. Background Art

Although robotics is a rapidly developing field, for decades to come there will be many applications and tasks that are far too complex and unstructured to be performed completely by unsupervised autonomous robots. Therefore, the need for direct human supervision and control of advanced robotic systems will continue. This is true both in space applications and in terrestrial applications, such as undersea exploration, remote defense technologies, and various tasks in the nuclear industry. Often it is necessary to have the human operator physically removed from the actual work site, remotely supervising and guiding the robot in the performance of a difficult or dangerous task. Remote manipulation is essential when barriers, distances or environmental hazards separate the human operator from a task to be performed. One of the key problems facing the designers of human-supervised robotic systems is how to interface human operators with these complex remotely operated machines.

Researchers have worked for many years to develop a useful, intuitive interface between human operators and teleoperated machines. In general, a teleoperator is any device that allows humans to manipulate or examine objects and environments remotely. In the late 1970's, J. K. Salisbury collaborated with A. K. Bejczy of the Jet Propulsion Laboratory to develop a force reflecting master for use in bilateral control of teleoperated systems. Reference is made to Bejczy and Salisbury, *Kinesthetic Coupling Between Operator and Remote Manipulator*, Proceedings of the International Computer Technology Conference, ASME, August, 1980 and to Bejczy and Salisbury, *Controlling Remote Manipulators Through Kinesthetic Coupling*, Computers in Mechanical Engineering, July, 1983, pp. 48-60, which describe the work of Salisbury and Bejczy. A manual hand controller input device is presently necessary for a human operator to control teleoperated machines.

A hand controller generally includes a plurality of structural members connected at joints that permit relative movement of the members as an operator moves a handgrip. As the operator moves the handgrip around in a defined work envelope, a control computer reads signals indicative of movements of each member and calculates the position of the handgrip relative to a defined reference. The computed information is then used to control the corresponding motion of the remote manipulator. The signals indicative of movements of the handgrip are typically transmitted to the control computer by sensors included in the hand controller.

Forces and torques applied by a telemanipulator in a remote work site may be sensed by various techniques. For example, a force/torque sensor may be mounted on the end of the telemanipulator to directly measure the forces and torques encountered. Each axis on the hand controller may have a motor associated therewith, which means that a six degree of freedom system has six motors.

The measured values of the forces and torques are transmitted to a control computer that is connected to the hand controller. The control computer transforms the force and torque signals into appropriate pulse width modulated signals to drive the six motors of the hand controller and reproduce a scaled representation of the forces and torques encountered in the remote work site. The human operator thus appears to feel the forces and torques exerted by the environment on the manipulator.

Forces and torques may be determined by a position disparity technique, which relies upon the relative disparity between the position commanded and the actual position achieved by the remote manipulator. Therefore, if the manipulator strikes a fixed object in the environment, there is a corresponding difference in the commanded position and the actual position of the manipulator. A force proportional to the magnitude of the disparity is generated in the hand controller.

SUMMARY OF THE INVENTION

This invention provides a new six-degree-of-freedom universal force-reflecting hand controller (FRHC) for use as the man-machine interface in teleoperated and telerobotic systems. The invention is characterized as a universal input device because the slave portion of a teleoperator used with the present invention does not need to be a kinematic equivalent of the master.

The FRHC according to the present invention provides a human operator with a natural and intuitive means for interacting with and controlling teleoperated systems. The features of this new design include excellent kinesthetic feedback, high-fidelity force/torque feedback, a kinematically simple structure, mechanically decoupled motion in all six degrees of freedom, and zero backlash. In addition, the new design has a much larger work envelope, greater stiffness and responsiveness, smaller stowage volume, and better overlap of the human operator's range of motion than previous designs.

A force reflecting hand controller according to the present invention includes at least six rotary joints and no prismatic, or sliding, joints. Motion about each joint is decoupled from motion about all the other joints, which simplifies the control software.

The FRHC according to the present invention has low friction joints and low mass. The mass of the FRHC is distributed to provide low inertia with respect to all six degrees of freedom. The motors are located so as to partially counter balance part of the weight of the links. The FRHC is operable both on the earth and in zero-gravity environments without modification.

Many future space operations will require the extensive use of robot manipulators and servicesrs to assist astronauts and scientists in exploring space and developing a space-based infrastructure. The present invention facilitates the use of robots in all operational environments. A human operator positions the mechanical arm of a remote robot by simply grasping the FRHC's handgrip and moving it in a desired direction and at a desired rate. The remote robotic arm responds by mirroring the operator's movements.

A universal input device according to the present invention for interfacing a human operator with a slave machine such as a robot or the like includes a plurality of serially connected mechanical links extending from a base. The mechanical links are arranged into a first group of linear position links and a second group of angular position links. A handgrip is connected to the mechanical links distal from the base such that a human operator may grasp the handgrip and control the position thereof relative to the base through the mechanical links. A plurality of rotary joints is arranged to connect the mechanical links together to provide at least three translational degrees of freedom and at least three rotational degrees of freedom of motion of the handgrip relative to the base.

The universal input device according to the present invention may further comprise a cable and pulley assembly corresponding to each joint such that each joint is cable driven, and a motor connected to each cable and pulley assembly for transmitting forces from the slave machine to the handgrip to provide kinesthetic feedback to the operator. The cable and pulley assemblies are formed such that any selected joint is kinematically decoupled from all of the other rotary joints such that motion of the handgrip that causes motion about any selected joint causes no motion of the handgrip relative to any of the other joints.

BRIEF DESCRIPTION OF THE DRAWINGS

FIG. 6 is illustrates the structure of an idler pulley assembly that may be included in the force reflecting hand controller of FIGS. 1-3;

FIG. 7 illustrates the structure of a termination pulley that may be included in the force reflecting hand controller of FIGS. 1-3;

FIG. 8 illustrates the structure of a tension equalizing pulley and tension arm idler pulleys that may be included in the force reflecting hand controller of FIGS. 1-3;

FIG. 10 is a perspective view showing a portion of a third link that may be included in the force reflecting hand controller of FIGS. 1-3 and showing components that may be included in a rotary joint formed between the second and third links;

FIG. 13 is a perspective view showing the tension arm and bushing assembly of FIG. 11 mounted on a shaft;

FIG. 18 is a cut away perspective view in the plane of FIG. 18 illustrating the passage of cables through the joint of FIG. 10; and FIG. 19 is a cross-sectional view taken about line 19—19 of FIG. 1 to illustrate the passage of cables through the joint of FIG. 10 from a different angle than that of FIG. 18.

DESCRIPTION OF THE PREFERRED EMBODIMENT

Figure 1:
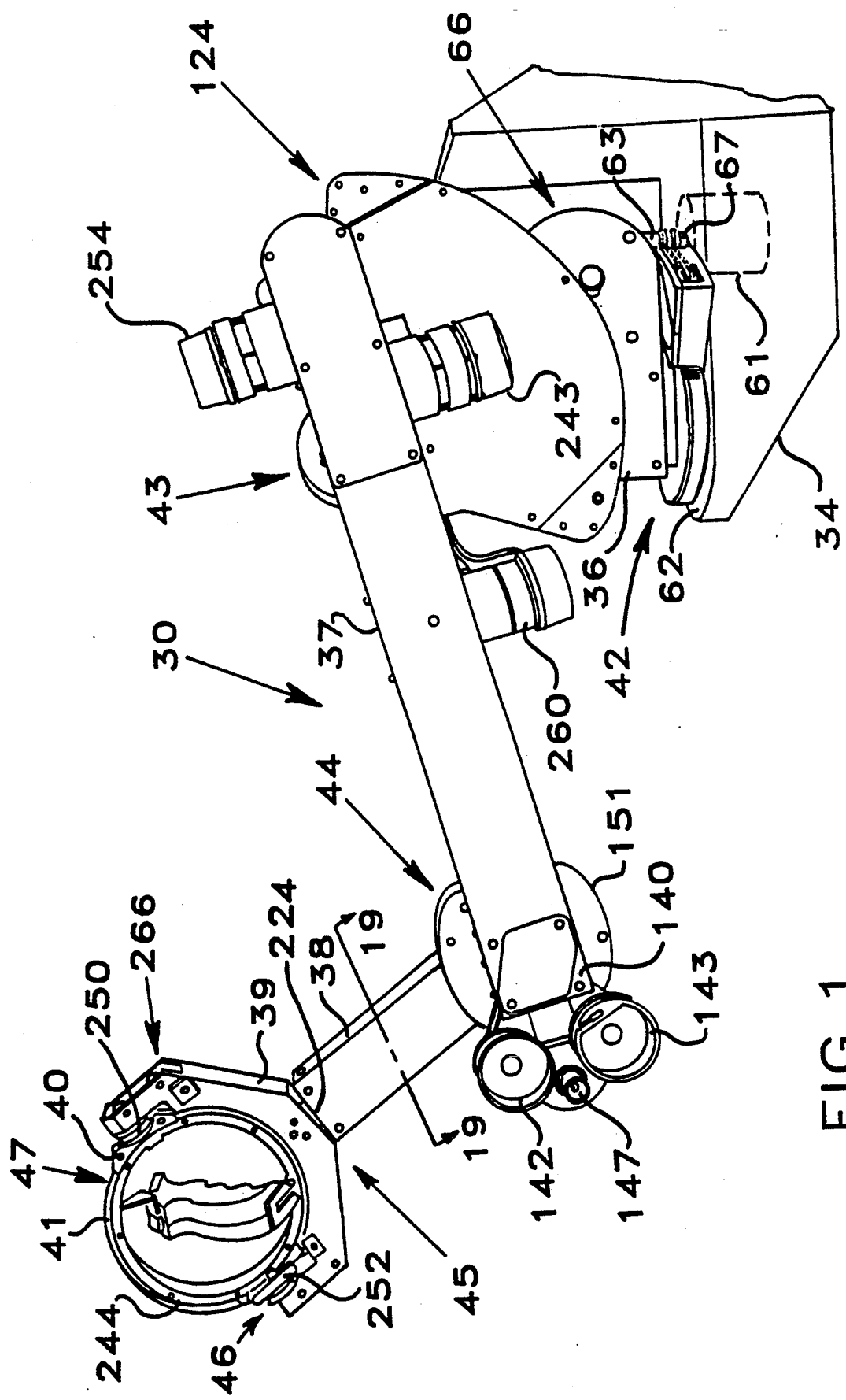
FIG. 1 is a perspective view showing a force reflecting hand controller according to the present invention in which a hand grip is connected to a base by six serially connected mechanical links and six rotary joints.
Figure 2:
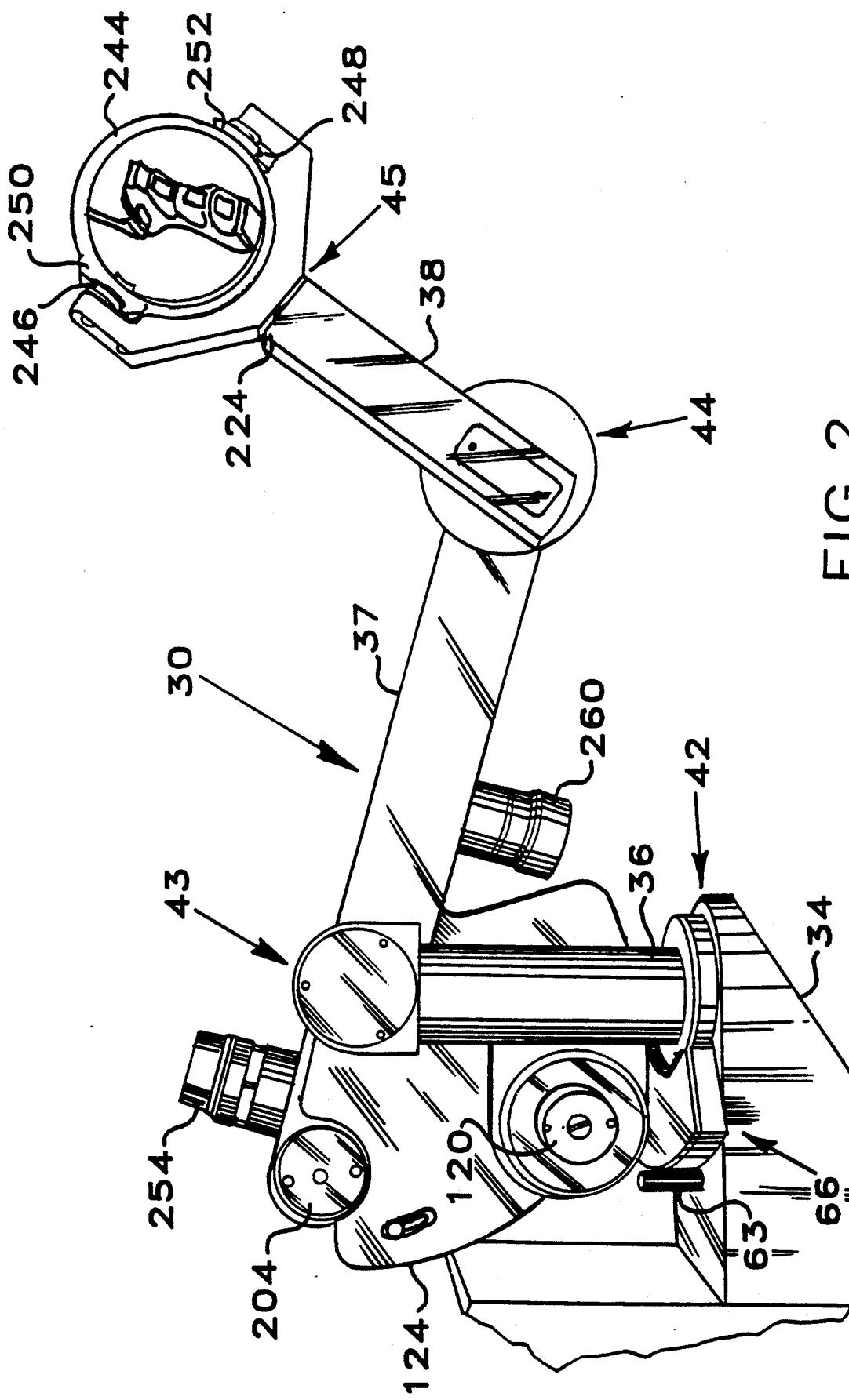
FIG. 2 is a perspective view showing the force reflecting hand controller of FIG. 1 from the reverse angle.
Figure 3:
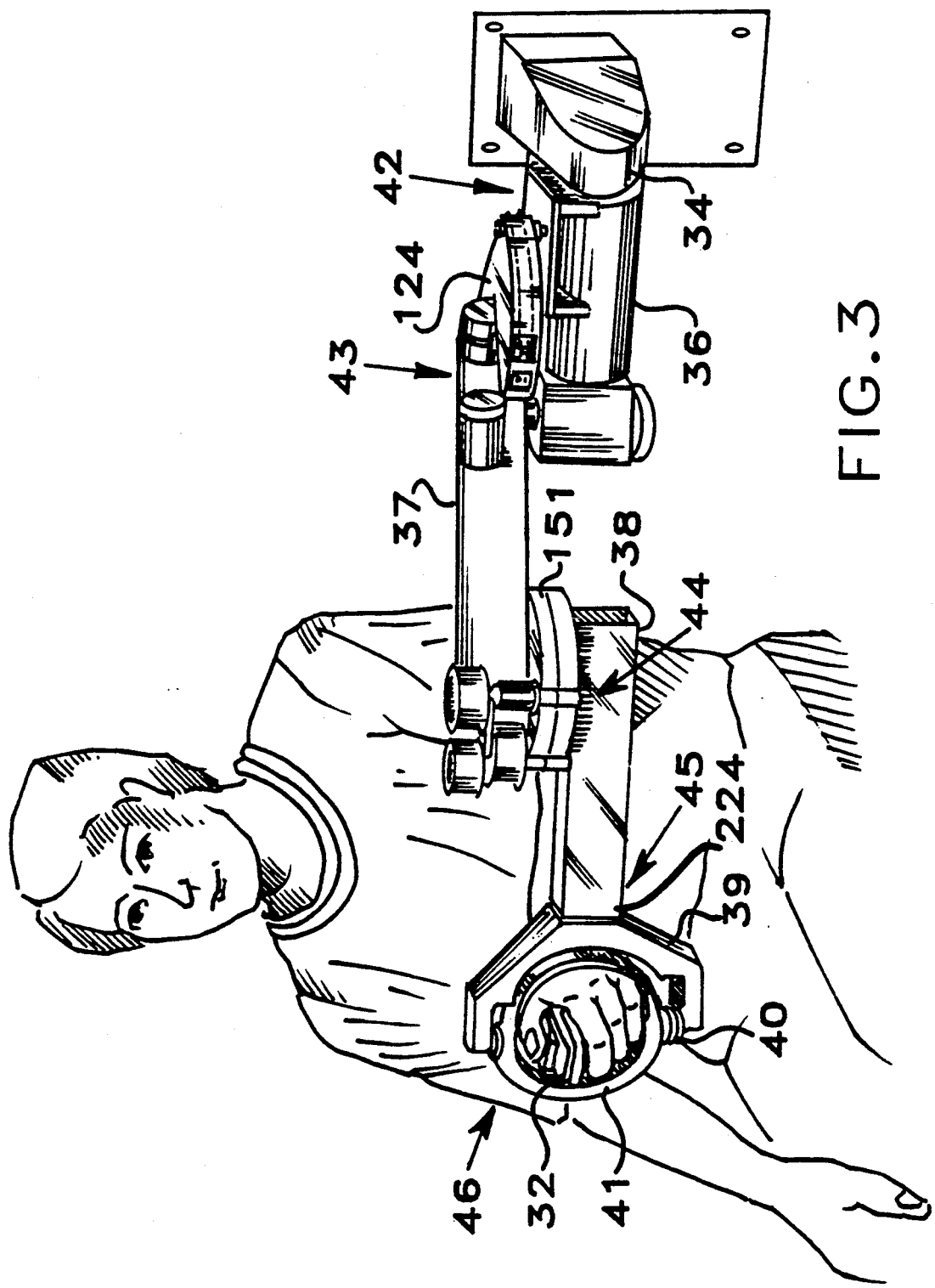
FIG. 3 is a perspective view illustrating a human operator using the force reflecting hand controller and showing the force reflecting hand controller rotated 90° from the orientation shown in FIG. 1.

Referring to FIGS. 1-3, a force reflecting hand controller 30 includes a gimbal-mounted handgrip 32 connected to a base 34 by a plurality of links 36-41. The links are serially connected at a plurality of rotary joints 42-47 so that the handgrip 32 has six degrees of freedom relative to the base 34. Six degrees of freedom are necessary to permit an operator to move the handgrip 32 in rotational and translational motion relative to three mutually perpendicular axes. As explained in detail subsequently, the links 36-38 and rotary joints 42-44 allow translational motion of the handgrip 32 while the links 39-41 and the joints 45-47 allow angular orientation of the handgrip 32.

Figure 4:
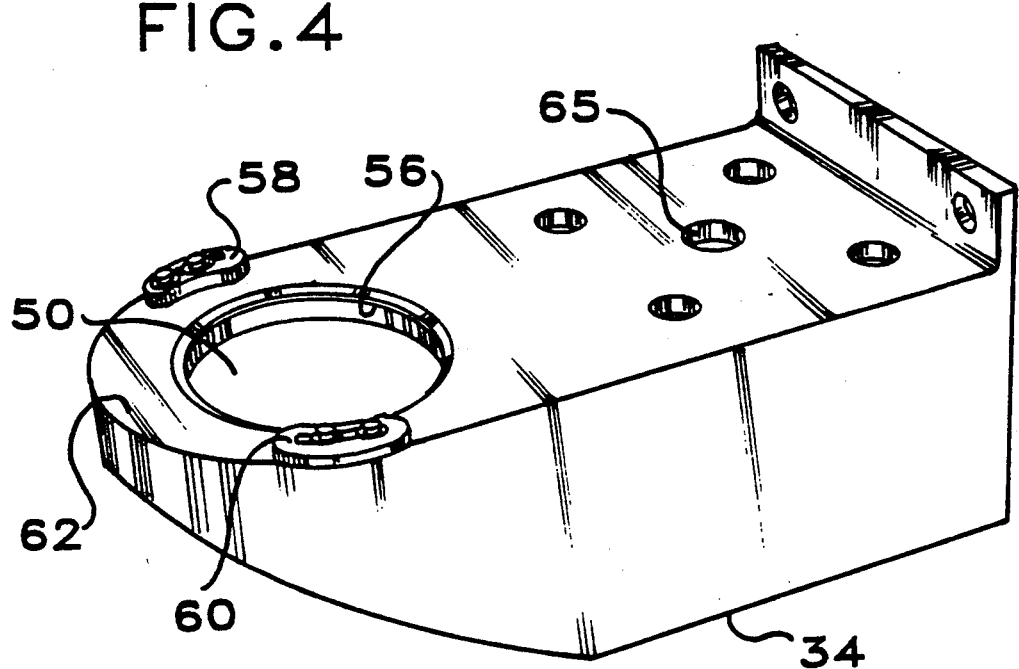
FIG. 4 is a perspective view of a base that may be included in the force reflecting hand controller of FIGS. 1-3.

Referring to FIGS. 1, 2 and 4, the base 34 includes an opening 50 where the rotary joint 42 connects the link 36 to the base 34. As shown in FIG. 4, the base 34 further includes a bearing race 56 mounted inside the opening 50 and a pair of adjustable limit stops 58 and 60 mounted on a surface 62 of the base 34 near the opening 50. The base 34 also preferably includes holes suitable for mounting it to a stable structure such as a mounting bracket or the like as shown in FIG. 3.

The rotary joint 42 is sometimes herein called the base joint. When the base joint 42 is assembled, the link 36 is rotatable about an axis through the center of the opening 50 and perpendicular to the plane of the surface 62. The positions of the limit stops 58 and 60 are determined by the range of rotational motion desired for the link 36 relative to the base 34.

Figure 17:
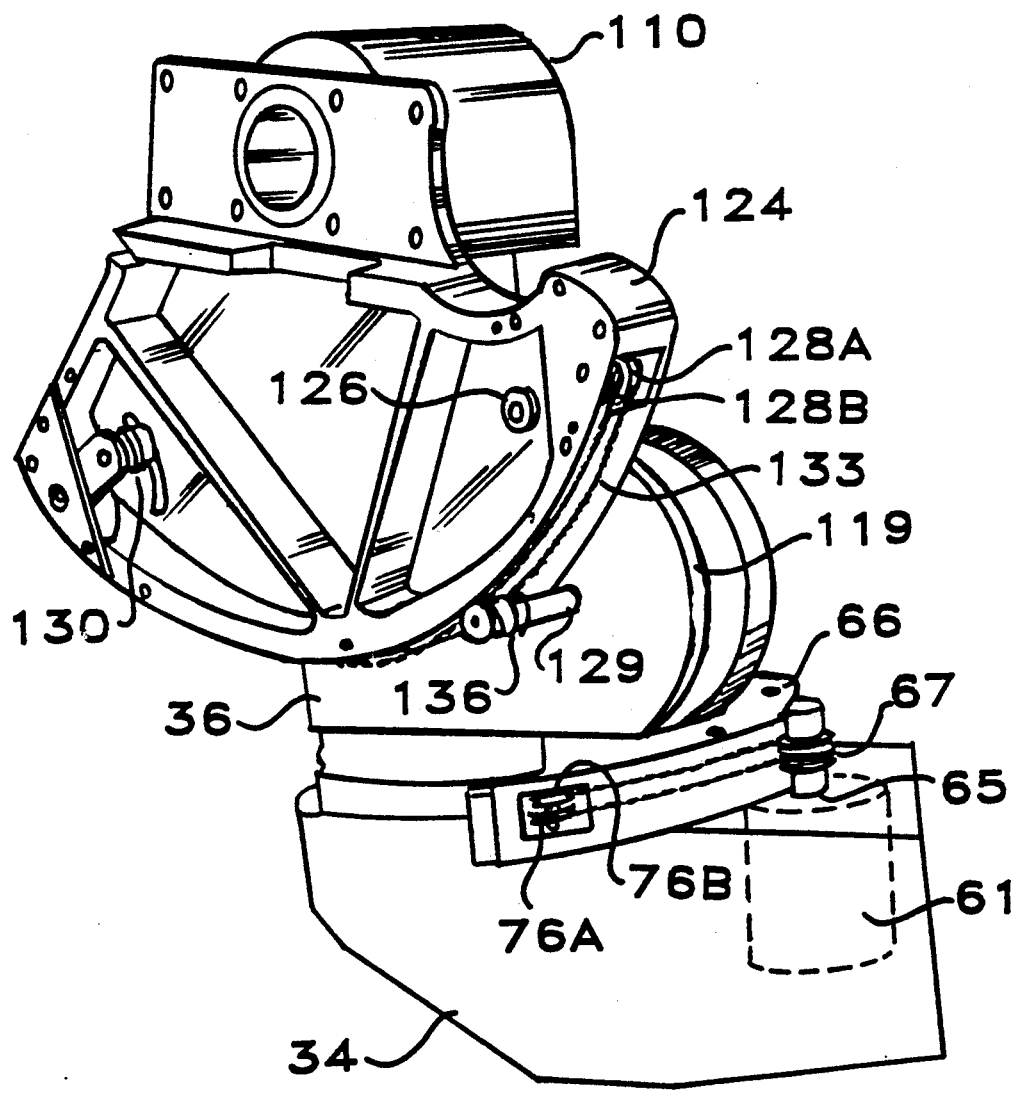
FIG. 17 is a perspective view illustrating cables and pulleys for two of the joints included in the force reflecting hand controller of FIGS. 1-3.

Referring to FIGS. 1 and 17, a motor 61 is mounted to the base 34 to drive the base joint 42, which is formed when the link 36 is connected to the base 34. The motor 61 has an output shaft 63 shown in FIGS. 1, 2 and 17 that extends through a hole 65, best shown in FIG. 4, in the base 34. As shown in FIGS. 1-5, a base joint pulley assembly 66 is fixed to the link 36 near the bearing 64. A drive cable 67, shown in FIG. 17, mounted to the base joint pulley assembly 66 and to the output shaft 63 transfers rotation of the motor output shaft 63 to the pulley assembly 66.

Figure 5:
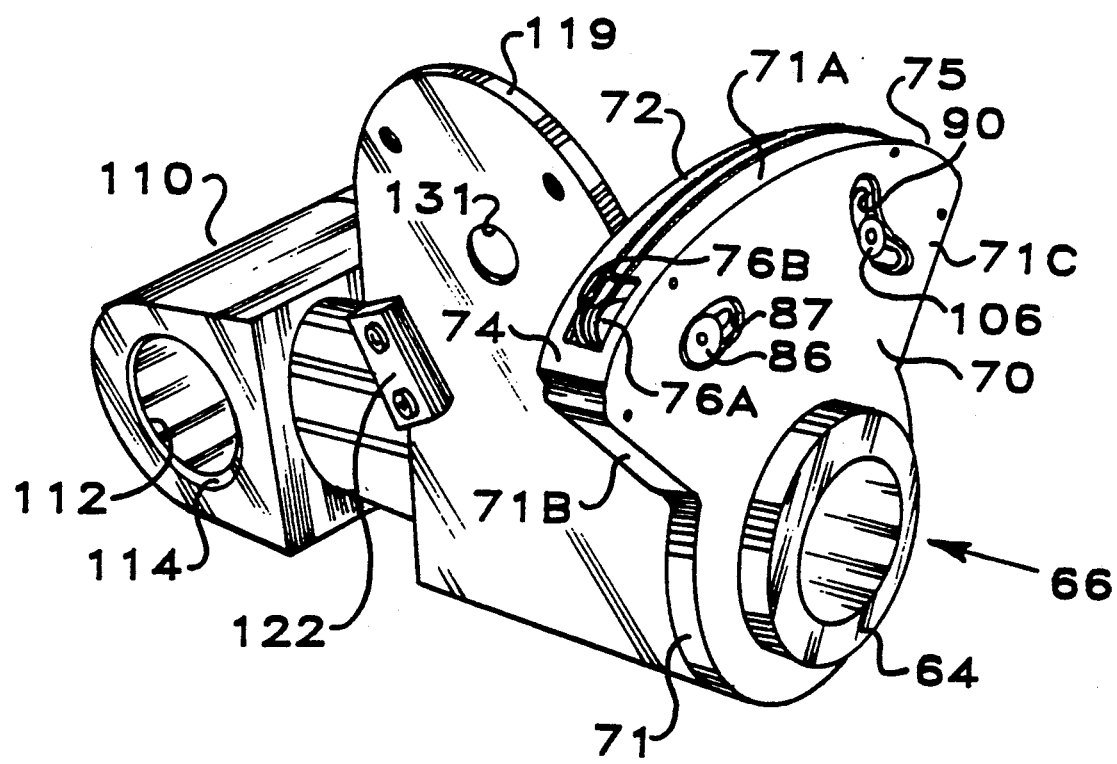
FIG. 5 is a perspective view showing a first link assembly that may be included in the force reflecting hand controller of FIGS. 1-3.
Figure 11:
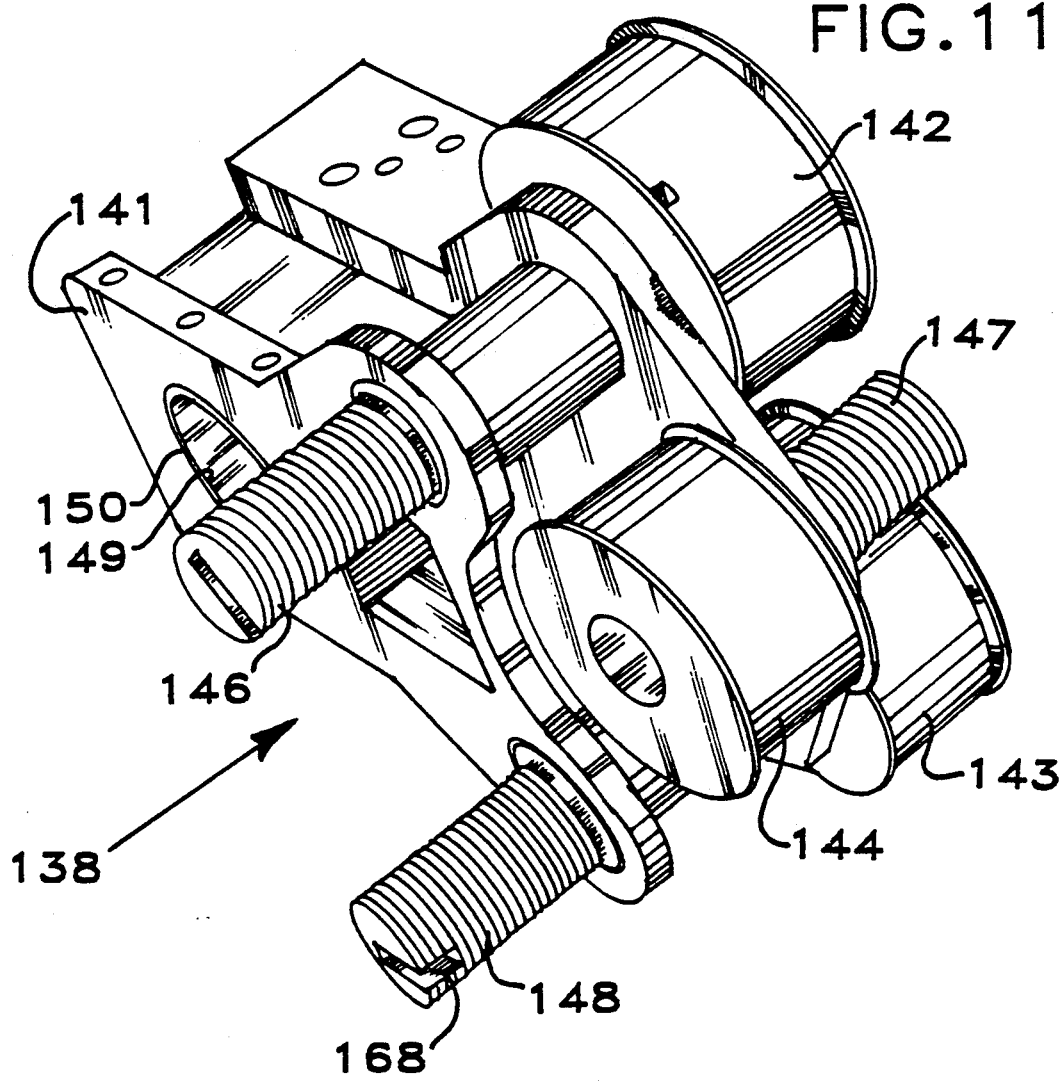
FIG. 11 is a perspective view of a bearing plug assembly that may be included in the rotary joint of of FIG. 10.

Referring to FIGS. 4 and 5, a bearing 64 is mounted to the link 36 for mounting inside the bearing race 56 to form the joint 42. A preloaded, four point contact, Gothic arch bearing functions satisfactorily to join the link 36 to the base 34. Such bearings are commercially available.

Referring again to FIGS. 1-5, the base joint pulley assembly 66 is preferably a sector pulley formed to comprise a pulley base 70 having an outer rim 71 and a four piece cover 72. The outer rim 71 has a portion 71A that spans a predetermined arc. The outer rim 71 has straight portions 71B and 71C that engage the limit stops 58 and 60 on the base 34 to limit the range of rotation of the joint 42. The pulley base 70, the outer rim 71 and the cover 72 enclose a cavity in which additional components are mounted as described subsequently.

Referring to FIGS. 5 and 6, near end 74 of the arc 71A, the base joint pulley assembly 66 includes a pair of tensioning idler pulleys 76A and 76B mounted in the pulley base 70. Another pair of tensioning idler pulleys 78A and 78B, shown in FIG. 8, are mounted to the pulley base 70 near the end 75 of the arc. The base joint pulley assembly 66 also includes a termination pulley 79, shown in FIG. 7, mounted near the tensioning idler pulleys 76A and 76B. A tension equalizing pulley 80, shown in FIG. 8, is mounted near the tensioning idler pulleys 78A and 78B.

Referring to FIG. 6, the tensioning idler pulleys 76A and 76B are assembled into the base joint pulley assembly 66 by first inserting one end of an tensioning idler pulley shaft 81 into a passage in the pulley base 70. A bushing 82 is placed on the shaft 81 adjacent the pulley base 70. The tensioning idler pulley 76A, a divider bushing 83, the tensioning idler pulley 76B and a bushing 84 are mounted on the shaft 81 as shown in FIG. 6. The shaft 81 is retained in position by placing its other end in a passage in the cover 72 and then securing the cover 72 to the pulley base 70 with suitable fasteners (not shwon).

Referring to FIG. 7, the termination pulley 79 is mounted on a shaft 85 having a threaded bore (not shown) therein. An adjustment screw 86 extends through a slot 87, shown in FIG. 7, in the pulley base 70. A bushing 88, the termination pulley 79 and a bushing 89 are placed on the shaft 85, which is then aligned with the adjustment screw 86 so that it may be engaged with the threaded bore in the pulley shaft 85. The head of the adjustment screw 86 engages the edges of the slot 87 to secure the pulley shaft 85 and the termination pulley 79 in a selected position in the pulley base 70. The slot 87 allows the termination pulley block 79 to be moved relative to the tensioning idler pulleys 76A and 76B and thereby provides for a coarse adjustment of the cable pre-tension.

FIG. 8 illustrates how the tension equalizing pulley 80 and the tensioning idler pulleys 78A and 78B are mounted in the base joint pulley assembly 66. A curved slot 90, best shown in FIG. 5, and a circular passage 91 are formed in the pulley base 70. A circular passage 92 is formed in the cover 72 opposite the circular passage 91. A tension arm 93 has an equalizer pulley shaft 94 and a tensioning idler pulley shaft 95 extending therefrom generally parallel to one another. The tensioning idler pulley shaft 95 includes projections 96 and 97 that extend from its ends. A bushing 98 has a hollow projection 99 that fits closely in the circular passage 92. The projection 96 fits closely in the hollow projection 99 to mount an end of the tensioning idler pulley shaft 95 to the pulley cover 72. A bushing 100, the tensioning idler pulley 78B, a divider bushing 101, the tensioning idler pulley 78A and a bushing 102 are placed on the tensioning idler pulley shaft as shown in FIG. 8. The bushing 108 includes a hollow projection 103 that extends into the circular passage 91. The projection 97 of the tensioning idler pulley shaft 95 extends into the bushing 102 to mount tensioning idler pulley shaft 95 between the pulley base 70 and the pulley cover 72.

Still referring to FIG. 8, the tension equalizing pulley 80 is mounted on the tension equalizer pulley shaft 94 between a pair of bushings 104 and 105. An adjustment screw 106 extends through the curved slot 90 for threaded engagement in the tension equalizing pulley shaft 94. The head of the adjustment screw 106 engages the edges of the curved slot 90 to hold the tension equalizing pulley shaft 94 in a set position. Fine cable pre-tension adjustments can be made by engaging a suitable torque wrench (not shown) with the end of the projection through the circular passage 91, rotating the wrench to the desired tension level, and then securing the adjustment screw 106 within slot 90.

Referring again to FIGS. 2 and 5, at the end of the link 36 opposite the base joint pulley assembly 66 there is a torso shaft 110 that includes a cylindrical bore 112. The centerline of the cylindrical bore 112 is perpendicular to and intersects the axis of rotation of the joint 42. A preloaded matched set of back-to-back duplex bearings 114 are mounted in the cylindrical bore 112 and separated by precision ground spacers. Referring to FIGS. 1-3, 5 and 9, the link 37 is mounted to the link 36 at the rotary joint 43, which is sometimes called the shoulder joint.

Figure 9:
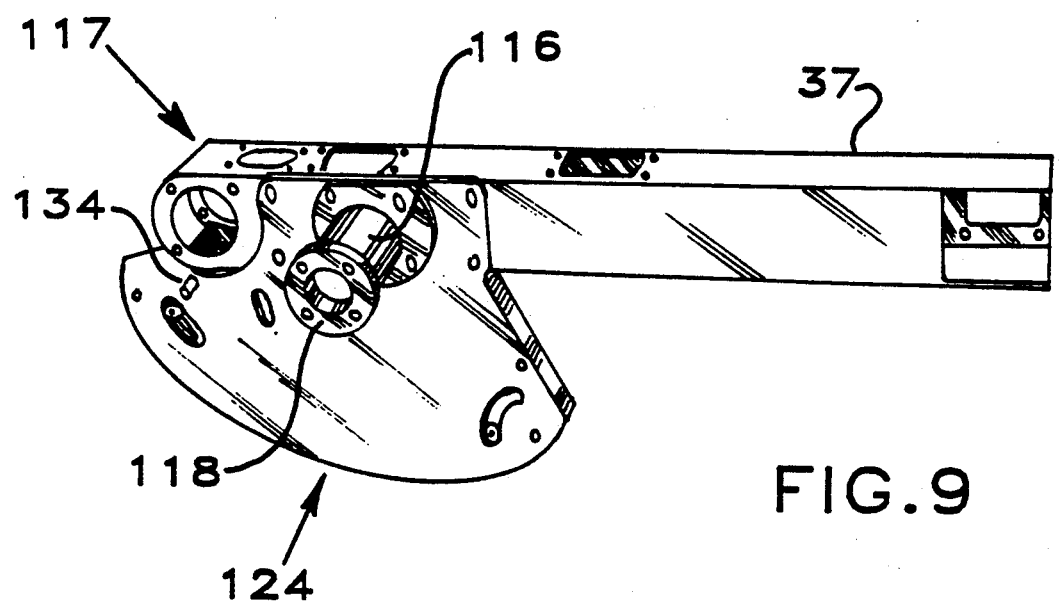
FIG. 9 is a perspective view showing a second link assembly that may be included in the force reflecting hand controller of FIGS. 1-3.

As shown in FIG. 9, a shoulder joint shaft 116 extends from the link 37 near an end 117 thereof. The joint 43, best shown in FIGS. 1-3, is assembled by placing the shoulder joint shaft 116 into the cylindrical bore 112 containing the matched duplex bearing set 114 and securing the inner races with a clamp 118.

Referring again to FIG. 5, the link 36 includes a bracket 119 for mounting a motor 120, shown in FIG. 2, that drives the rotary joint 43. A stop 122, shown in FIG. 5, may be attached to the link 36 for limiting the range of motion of the link 37 relative to the link 36. The location of the stop 122 depends upon the range of motion desired for the rotary motion of the link 37 about the joint 43.

Referring to FIGS. 1-3 and 9, the link 37 is an elongate member preferably formed of hollow aluminum tubing to have a square cross section with high strength and low mass. A shoulder pulley assembly 124 is mounted to the link 37 to have an axis of rotation coincident with the axis of the shoulder joint shaft 116. The shoulder pulley assembly 124 is similar to the base joint pulley assembly 66. Referring to FIGS. 9 and 17, the shoulder pulley assembly 124 includes a cable termination block 126, a pair of tension idler pulleys 128A and 128B, a tension equalizing pulley 130 and two equalizing idler pulleys (not shown). The shoulder pulley assembly 124 may include a limit stop pin 134 that limits its range of angular motion.

The motor 120 and the shoulder pulley assembly 124 are located on opposite sides of the bracket 119. Referring to FIG. 17, the motor 120 has an output shaft 129 that passes through a hole 131, shown in FIG. 5, in the bracket 119. A drive cable 133 shown in FIG. 17 is routed over the tension equalizing pulley 130, the two tension idler pulleys (not shown) near tension equalizing pulley 130, around the motor shaft 129 (three wraps), and over the tension idler pulleys 128A and 128B with both ends of the cable terminating at the cable termination block 126. Therefore, rotation of the motor shaft 129 rotates the shoulder pulley assembly 124 about the axis of the joint 43, which is the center line of the cylindrical bore 112.

Referring to FIGS. 1-3 and 9-11 the force-reflecting hand controller 30 includes a rotary joint 44, also called the elbow joint, that provides a means for rotating the link 38 relative to the link 37. The joint 44 is formed by the union of a three stage cable drive reduction assembly 138 shown in FIG. 11. The assembly 138 is mounted to the end of link 137 opposite the end 117 to an output pulley assembly 151 that is mounted to link 38.

Referring to FIGS. 1, 9-11, and 16, the three stage cable drive reduction assembly 138 includes a frame 141 and three reduction pulleys 142-144 mounted within the frame 141 on axes parallel to each other. The pulleys 142-144 are arranged to provide drive train reduction in close proximity to rotary joint 44 for better transmission efficiency. The pulleys 142-144 reduce to smaller diameter shafts and mount to the frame 141 by means of three pairs of thin section bearings (not shown) and extend outward from the frame 141 as pulleys 146-148 of reduced diameter.

Also included within the cable drive reduction assembly 138, and referred to in more detail hereafter, is a bore 149 and two shafts that mount stacks of guide pulleys 197A and 197B within frame 141. The guide pulleys 197A and 197B provide means for transmitting cables 198A, 198B, 199A, 199B, 200A, 200B, shown in FIGS. 16-19, that actuate the orientation degrees of freedom joints 45-47, so that the cables traverse the joint 44 fully decoupled and independent from any relative rotation of links 38 and 37 about joint 44. The center of bore 149 is coincident with the axis of rotation for joint 44 and provides means for mounting a preloaded matched duplex bearing set.

Referring to FIGS. 1-3, 10, 12, 13 and 16, the output pulley assembly 151 of the rotary joint 44 includes a pulley base 152 having a shallow cavity 158 that contains a system of smaller cable tensioning pulleys described in more detail hereafter. Included in the output pulley assembly 151 is a hollow shaft 166, best shown in FIG. 12, whose bore provides a pathway for transmission cables for rotary joints 45-47 traversing the joint 44. The shaft 166 extends outward from the center of pulley base 152 above the cover plate 155A and, when mounted to the three stage cable drive reduction assembly 138, engages the duplex bearing set mounted within the bore 149 of frame 141. When assembled, the center of the bore of shaft 166 is coincident with the axis of rotation for the joint 44 and allows relative motion of the link 38 with respect to the ink 37.

A motor 204, shown in FIG. 2, mounted to the link 37 near the end 117, is arranged to provide output torque to drive the rotary joint 44 through a three stage cable drive train. The drive train for the joint 44 includes a split hub pulley (not shown) mounted onto the output shaft of the motor 204, steel drive cables traversing the hollow length of link 37 and connecting the pulley 144 to the split hub motor pulley with a 1:1 drive ratio. The pulley 144 reduces to the diameter of the pulley 147 and engages pulleys 143 and 142 via another steel cable with a 2.8:1 drive ratio. The pulleys 142 and 143 reduce in diameter to the pulleys 146 and 148 and engage the output pulley assembly 151 via a set of two steel cable segments with a 6.6:1 drive ratio. The result is an overall motor to output pulley drive ratio of 18:1.

Since a single motor 204 produces both the antagonistic forces required to actuate joint 44, as on other joints, means for pre-tensioning the cable drives to a level at least one half their maximum expected load is provided to prevent the cables from becoming slack under maximum load and to increase the apparent transmission stiffness. The first stage of the three stage cable drive train for rotary joint 44 is pretensioned by loosening the two screws locking the split hub pulley halves together, rotating the pulley halves relative to one another by holding one stationary and applying a torque wrench to a hex slot cut in the other and, while attaining the proper pre-tension, re-tightening the two screws.

Referring to FIGS. 10, 12, 13 and 16 the two steel cable segments included in the last stage of the three stage drive train that actuates joint 44 are routed as follows. One end of the first cable segment is terminated and inserted into a slot provided in the end of pulley 146 and then wrapped around the pulley 146 and engaged with the output pulley assemby 151. The cable wraps partially around the output pulley assembly 151, around a lower tension idler pulley 164A, around a stationary tension equalizing pulley (not shown) around an upper tension idler pulley 164B, back over the outer rim 156 of the pulley base 152, and then back around the pulley 146, terminating in the same slot as before. Spiral grooves in the surfaces of the pulleys 146 and 148, shown in FIG. 11, cause the cable to track properly across the smooth outer surface of the output pulley assembly 151 as the pulleys rotate relative to one another. One end of the second segment of cable constituting the third stage is terminated and inserted into a slot in the end of output pulley 148. The cable wraps around the pulley 148 and then wraps around the pulley 152 in the opposite direction from before, over the lower tension idler pulley 165A of FIGS. 12 and 13, around a tension equalizing pulley mounted to a tensioning arm 170 by means of a shaft 162, around the upper tension idler pulley 165B, back over the outer rim 156 of pulley base 152, and then back around pulley 148, terminating in an end slot 168 provided in the pulley 148.

Figure 12:
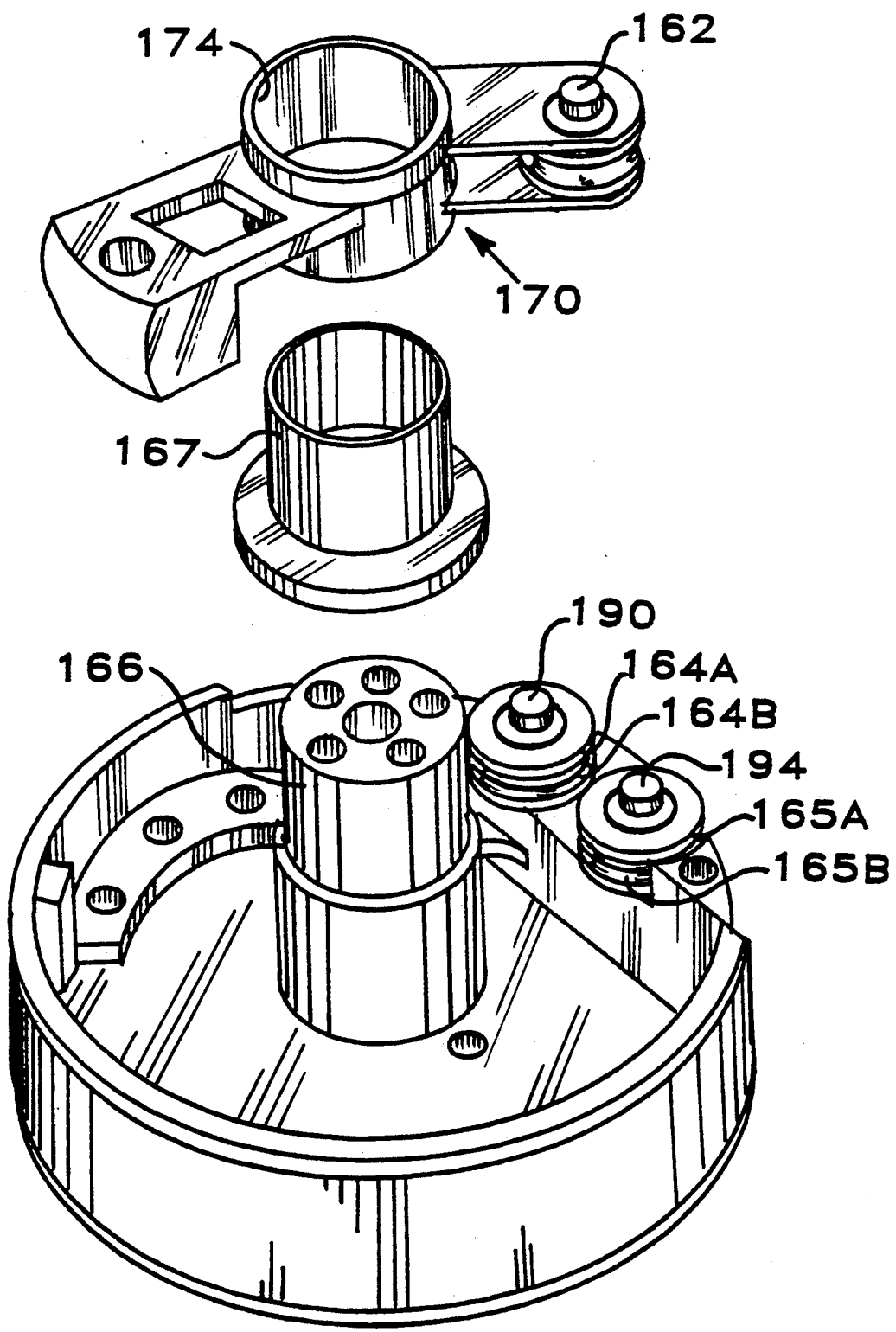
FIG. 12 is an exploded perspective view showing a tension arm and bushing assembly that may be included in the joint of FIG. 10.

Referring to FIGS. 12 and 13, the lower tension idler pulley 164A and the upper tension idler pulley 164B are separated by a bushing and mounted to a shaft 190. The shaft 190 is fixed to output pulley base 152 at the bottom and held in place by cover 155B at the top. The two tension idler pulleys 165A and 165B are mounted in a similar manner to shaft 194. The tensioning arm 170 has a centrally located bore 174 into which slides a bushing 167 which in turn slides over the hollow shaft 166 as best shown in FIGS. 12 and 13.

The routing method described above results in the third stage having two double spans of cable which increases the transmission stiffness. These cable spans can be accurately pre-tensioned by removing cover plate 155A, loosening a locking screw 180 shown in FIG. 14 that secures the tensioning arm 170 to pulley 152 at threaded hole 192, locking tensioning arm 170 to frame 141, rotating link 38 relative to link 37, and then re-tightening locking screw 180.

Figure 14:
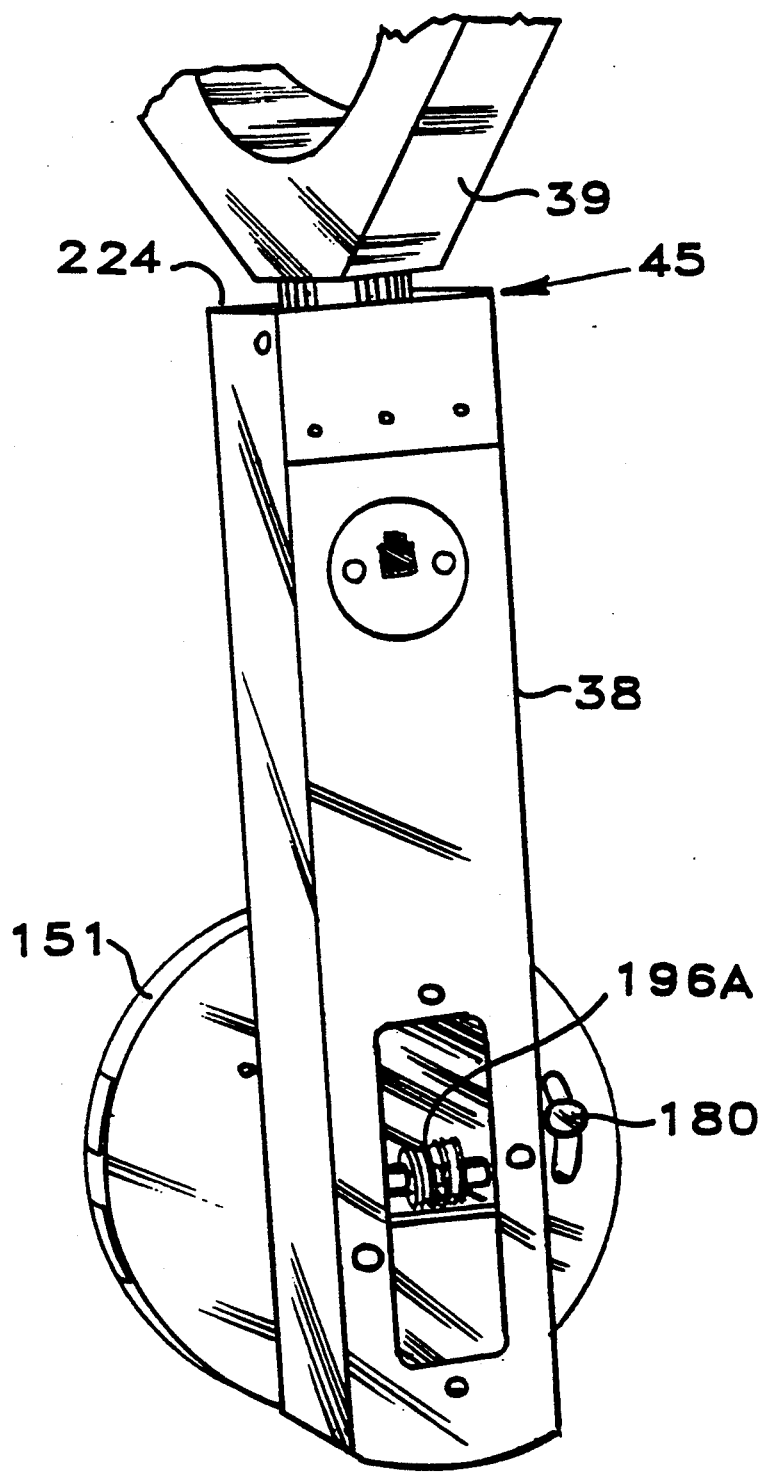
FIG. 14 is a perspective view showing a pulley bracket that may be included in the third link and a handgrip gimbal assembly that may be included in the force reflecting hand controller according to the present invention.

Referring to FIGS. 14, 18 and 19 assembly of the link 38 includes mounting a plurality of guide pulley assemblies 196A, 196B and 196C in the end of the link 38 near the joint 44. These guide pulley assemblies 196A, 196B and 196C cooperate with the pulleys 197A and 197B to route cables 198A, 198B, 199A, 199B, 200A, 200B for the joints 45–47 through the joint 44 and the link 38.

Referring to FIGS. 14, 18 and 19, guide pulley assemblies 196A, 196B and 196C for the joints 45–47 are mounted in the link 38. The guide pulley assemblies 196A, 196B and 196C preferably include two pulleys each as shown in FIG. 19. Guide pulley assemblies 197A and 197B that each comprise a stack of three pulleys are mounted to the link 37.

A first length of cable 198A for the joint 45 passes around a pulley (not shown) in the stack 197A, and a second length of cable 198B for the joint 45 passes around a pulley in the stack 197B. The cables 198A and 198B are then routed through the hollow shaft 166 to the guide pulley assembly 196A. Similarly, cable lengths 199A and 199B for the joint 46 are routed around corresponding pulleys in the stacks 197A and 197B, respectively, to the guide pulley assembly 196B. Cable lengths 201A and 201B for the joint 47 are routed around corresponding pulleys in the stacks 197A and 197B, respectively, to the guide pulley assembly 196C.

Referring to FIGS. 1-3, 15A and 15B the handgrip 32 is mounted in a gimbal assembly 220. The gimbal assembly 220 is mounted to an end 224 of the link 38 as best shown in FIGS. 1-3 and 14. The link 39 of FIG. 1 may be formed as a generally semicircular gimbal yoke 226. The link 40 may be formed as a circular gimbal ring 227. The gimbal yoke 226 is mounted to be rotatable about the longitudinal center line of the link 38 at the rotary joint 45. The joint 45 includes a bearing housing 230 in a gimbal mounting bracket 232 and a pulley 234. The joint 45 may also include a limit stop (not shown). A shaft 236 fixed to the gimbal yoke 226 passes through the gimbal mounting bracket 232. The pulley 234 for the joint 45 is fixed to the shaft 236, and the bracket 232 is mounted to the end of the link 38. A pair of guide pulleys 240 and 242 are mounted to the bracket 232 to guide the cables 198A and 198B to the pulley 234 from a motor 243 mounted to the link 37.

Figure 15:
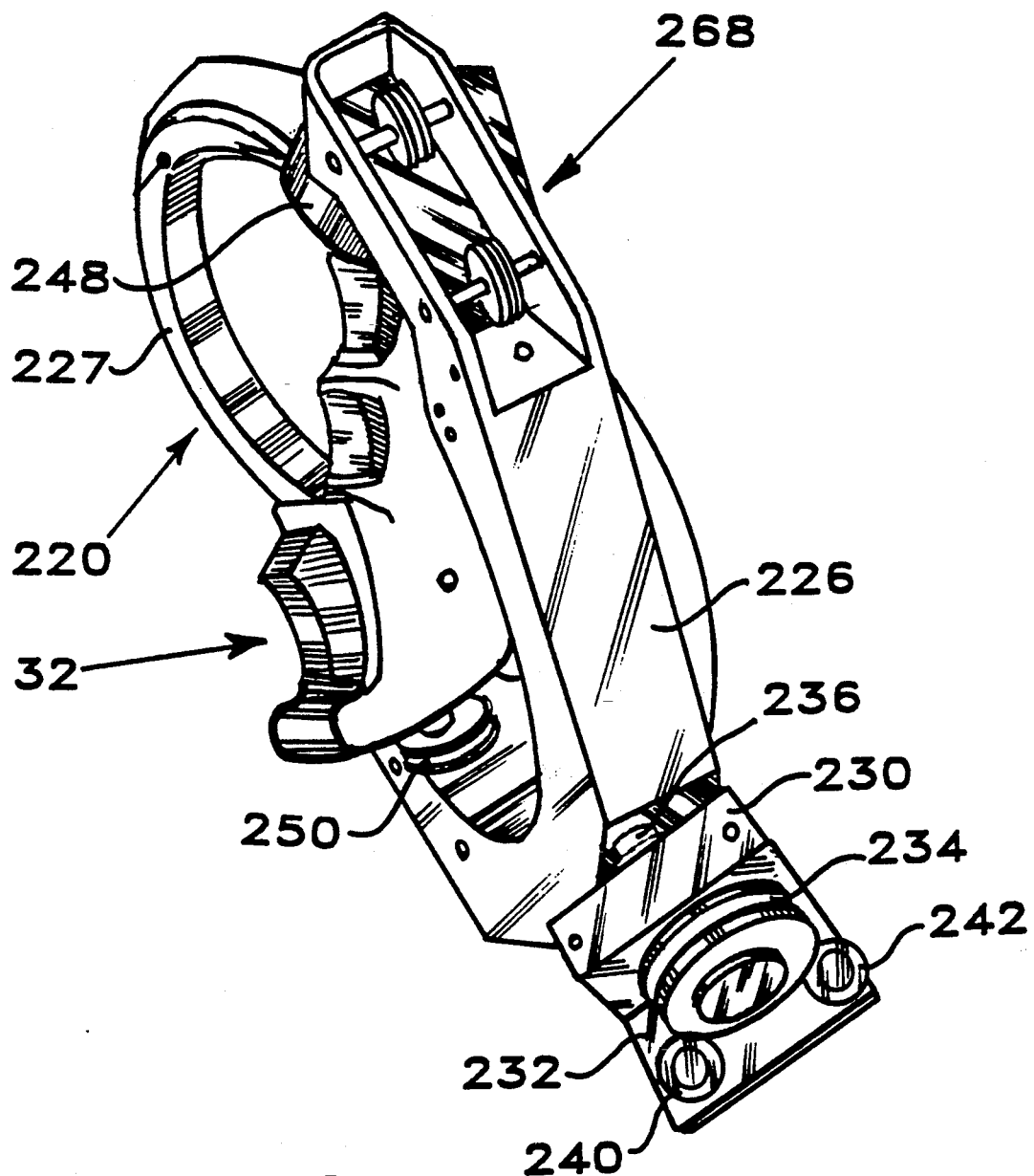
FIGS. 15A and 15B are perspective views of the handgrip gimbal assembly of FIGS. 1-3.
Figure 15B:
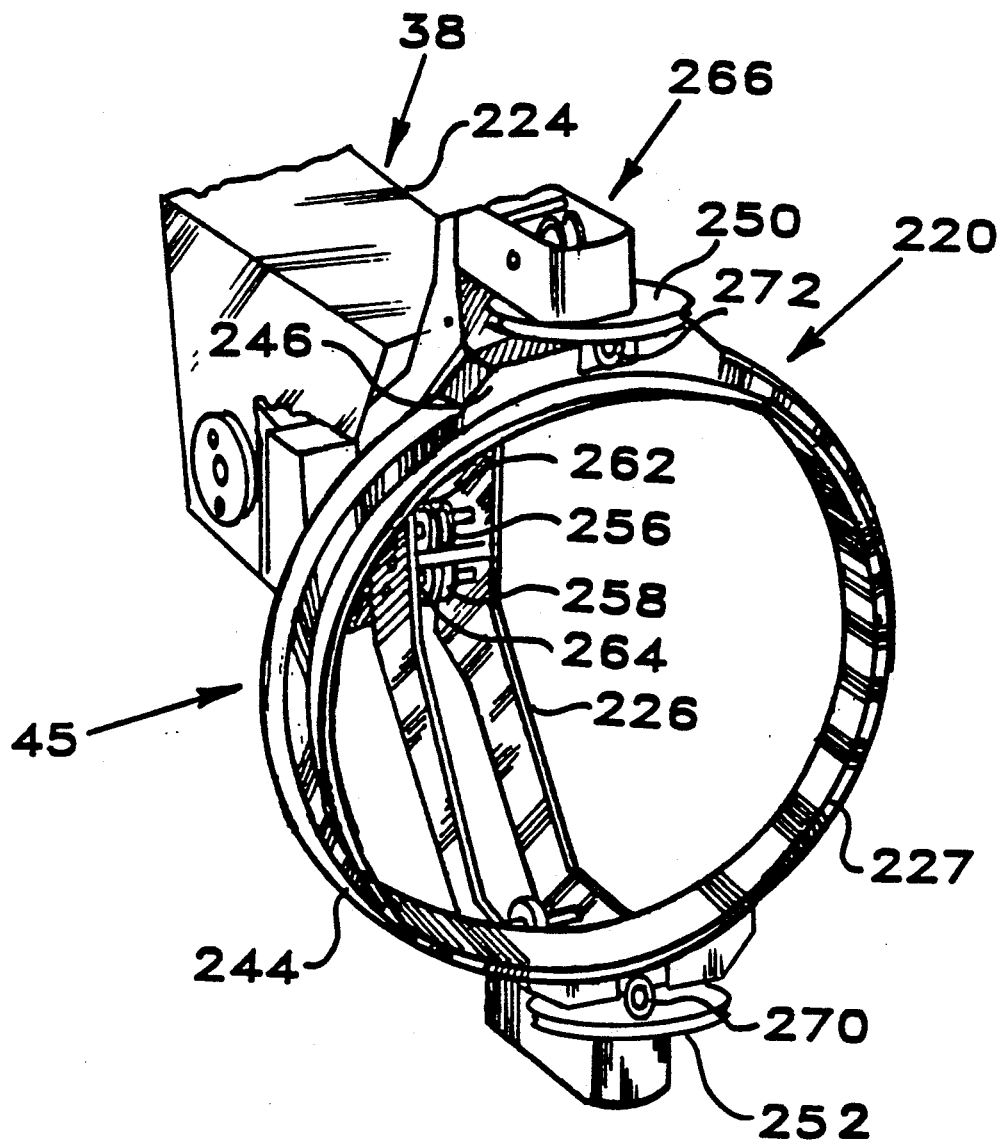
Figure 16:
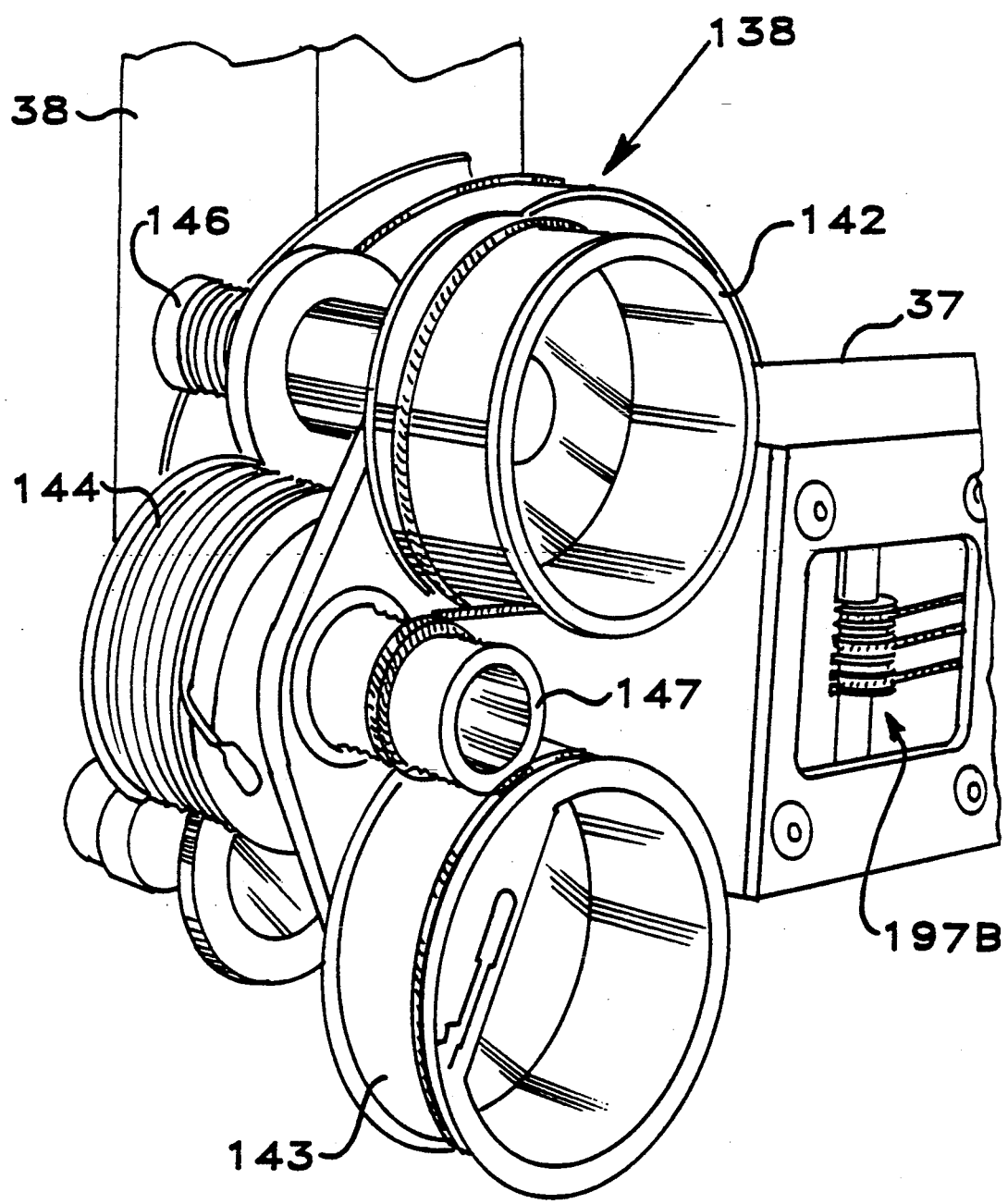
FIG. 16 is a perspective view showing a reduction drive mechanism and cabling that may be included in the joint of FIG. 10.

The gimbal ring 227 has a peripheral flange 244 shown in FIGS. 1 and 15B. The peripheral flange fits within slots formed in a pair of mounting brackets 246 and 248 shown in FIGS. 1, 2, and 15B that are connected to the gimbal yoke 226 at the joint 46. A gothic arch, x-contact bearing (not shown) is mounted to the flange 244. The bearing has an inner race that is clamped to the ring 227 by a secondary ring (not shown). The bearing has an outer race that fits within slots formed in the brackets 246 and 248 for the joint 46. The two brackets 246 and 248 mount to the yoke 226 with a preloaded angular contact bearing (not shown).

Referring to FIGS. 1, 2, 15A and 15B, the joint 46 includes a pair of pulleys 250 and 252 fixed to the brackets 246 and 248, respectively. The pulleys are connected via the cable lengths 199A and 199B to a motor 254 that is mounted to the link 37 near the end 117 as shown in FIGS. 1-3. The cable lengths 199A and 199B pass through the joint 45. As shown in FIG. 15B, a pair of guide pulleys 256 and 258 direct the cable length 199A and 199B from the vicinity of the joint 45 to the pulleys 250 and 252 that are used to drive the joint 46. Additional guide pulleys may be used as necessary to direct the cable lengths 199A and 199B through the gimbal yoke 226 to the pulleys 250 and 252 without interfering with motion of the gimbal ring 227.

The pulleys 250 and 252 are connected to the flange 244 via a thin section of the gothic arch bearing. The gimbal ring 227 is rotatable about a line perpendicular to the plane of FIG. 1. The handgrip 32 is fixed to the gimbal ring 227 and is, therefore, rotatable about three mutually perpendicular axes.

The rim of the gimbal ring 227 functions as the drive pulley for the joint 47. The cable lengths 200A and 200B for the joint 47 pass from a motor 260 mounted to the link 37, as shown in FIGS. 1-2, through the interior of the link 37 to the joint 44. The cable lengths 200A and 200B then pass through the joint 44 as described above along the axis thereof to the end of the link 38. Guide pulleys 262 and 264 then direct the cable lengths 200A and 200B for the joint 47 from the vicinity of the joint 45 to guide pulley assemblies 266 and 268 that are used to guide the cable lengths 200A and 200B to the ends of the gimbal ring 227. The cable lengths 200A and 200B then pass through the centers of the pulleys 250 and 252 to a pair of small guide pulleys 270 and 272, shown in FIG. 15B, that direct the cables to the rim of the gimbal ring 227.

Joint 44 preferably includes a 3-stage drive reduction mechanism to provide the desired stiffness goals. The other five joints in the force reflecting hand controller 30 may have only single stage drives.

The links 36–38 and rotary joints 42–44 allow translational motion of the handgrip 32 while the links 39–41 and the joints 45–47 allow orientation of the handgrip 32. The rotary joints 42 and 43 have perpendicular axes that intersect. The joint 44 has an axis of rotation that is parallel to the axis of the joint 43. The joint 44 is displaced from the joint 43 by about 15 inches.

The motors for the joints 44–47 are mounted on the link 37 near the end 117. The cable circuits for each of the joints 45–47 should be pretensioned to prevent backlash in the mechanisms.

The combined weights of the motors thus act to partially counter balance the weight of the links 37. The motors preferably are brushless DC torque motors having 1000 line, dual quadrature, incremental optical encoders mounted directly on their shafts.

The actuator transmission design includes a unique steel-cable routing scheme. This type of transmission, as opposed to geared transmissions, provides drive mechanisms with virtually no backlash. The cable drive system also allows three other very significant design features: (1) the inertial effects from the mass of each motor are greatly reduced because the motors are all mounted near the base of the hand controller, (2) the design has no kinematic offsets, and (3) the steel-cable routing design permits all six joints to be fully decoupled from one another such that each joint rotates completely independent of all others. The links are physically offset, which allows the hand controller to fold up into a compact unit when not in use.

Several design parameters are of particular interest in evaluating the utility and effectiveness of the FRHC 30. These parameters include positional resolution, dynamic range of the force output, friction levels, inertia, backdrivability, backlash, stiffness, dynamic mechanical response, and resonant frequencies.

The overall hand controller mechanical stiffness was a primary concern during the design process. This is evident at several critical locations throughout the design. Joints 42 and 45 preferably include single preloaded, gothic-arch, x-type bearings. Joints 43 and 44 preferably include a matched pair of preloaded, back-to-back duplex bearings. Links 37 and 38 preferably are made of aluminum tubing with a square cross-sectional shape which is significantly stiffer than round tubing of the same basic size. The steel transmission cables, used in all six joints, preferably are pretensioned. Each joint steel cable circuit can be accurately pretensioned. The transmission circuits for joints 42 and 43 preferably include double spans of steel-cable in order to reach desired stiffness levels. The force reflecting hand controller 30 provides kinesthetic feedback to the operator. The act of moving a telerobot's mechanical hand in the performance of a task is directly related to the physiological motor sensations that would occur if the operator were performing the task with his own hand. The intrinsic eye-hand coordination of the human operator is fully utilized, making the performance of the task at the remote work site highly intuitive to the operator.

The force reflecting hand controller 30 provides high-fidelity force feedback, so that the it has a good dynamic force output capability. Small feedback forces to the operator are not obscured by friction levels, and yet the force reflecting hand controller 30 can also output relatively large forces. Moreover, the forces and torques transmitted to the operator are crisp and distinguishable.

Because the force reflecting hand controller 30 is kinematically simple, the structure of the FRHC 30 is simple to describe mathematically. The FRHC 30 has no kinematic joint offsets and several of the joint axes intersect at right angles thereby making it one of the simplest configurations possible for a six degree of freedom manipulator. This simple configuration helps to minimize the computer time required to calculate the location of the center of the handgrip 32 relative to a fixed reference location.

One feature of the FRHC 30 that greatly simplifies the control algorithms is that all six degrees of freedom are mechanically decoupled. This means that each of the six mechanical joints on the FRHC 30 rotate independently of all others. Therefore, the control algorithms that determine the joint torques are direct and do not need to make the otherwise necessary compensation.

The use of preloaded bearings and pretensioned cables allows the force reflecting hand controller 30 to have zero joint backlash. Having no backlash, or free play, is an important feature because it eliminates position deadband in the mechanism and increases the stability of the control system.

Minimizing friction was an important consideration during the FRHC 30 design. The FRHC 30 according to the present invention is run open loop, i.e., the actual output forces to the operator are not measured or fed back to the control algorithms. Therefore, friction becomes a limiting factor in determining the smallest commandable output force and affects the force resolution. Large friction forces could deflect the operator from an intended input path and, in severe cases, could degrade the backdrivability of the hand controller.

The hand controller according to the present invention is designed to have maximum stiffness and responsiveness. This attention to structural stiffness improves the quality and clarity of the forces the operator feels because it shortens the response time of the mechanism and also contributes to control system stability.

The work envelope of a hand controller refers to the three-dimensional space through which the operator is able to move the handgrip. In special mounting configurations this work envelope coincides directly with the range of motion for the human operator's arm. Therefore, the FRHC 30 can follow almost any motion of the human operator's hand over its entire reach.

The positional resolution, i.e., the smallest detectable motion at the handgrip 32, changes slightly across the work volume due to the geometry involved. At near full extension, the FRHC 30 has its least resolution. However, even in this worst case configuration, the positional resolution is still better than 0.002 of an inch. The positional resolution increases as the handgrip is moved closer to the axis of the joint 42.

The dynamic range of output forces and torques provides insight into the quality and clarity of the forces that are reflected back to the person operating the FRHC 30. The dynamic range is defined as the maximum commandable output force divided by the minimum commandable output force. The output forces in the X, Y, and Z directions are position dependent and are inversely proportional to the distance out from the axis of the joint 42. In the worst case, when the hand controller is fully outstretched and operating in gravity, the FRHC 30 can output feedback forces to the human operator ranging from about 3 ounces up to 67 ounces. Larger forces are possible as the handgrip 32 is moved closer to the axis of the joint 42. In space applications, the maximum output forces in the plane defined by the links 37 and 38 will be significantly higher since there are no gravitational forces to counteract.

The friction forces the operator feels vary throughout the work volume depending again on the distance between the handgrip and the axis of the joint 42. With the hand controller near full extension, these friction levels are about 3 ounces in any direction and slightly increase as the handgrip is moved closer to the axis of the joint 42. The friction levels for the three orientation degrees-of-freedom are constant and are about 6 in-oz. for each of the joints 45 and 46 and about 13 in-oz. for the joint 47.

The overall mass of the force reflecting hand controller 30 is preferably kept as small as possible without compromising structural ruggedness. A working prototype has a total weight of 32 lbs. The motors, which collectively contribute almost half the overall mass, are mounted near the base of the hand controller, which greatly reduces their inertial effects. The low overall inertia and friction levels result in the hand controller mechanism being very backdrivable so that forces encountered by the robot arm are accurately transmitted to the handgrip 32.

At over 4 cu. ft. the FRHC 30 has a work envelope that more than doubles that of previous hand controllers. This was done in order to maintain its applicability to a wide variety of tasks. Yet the FRHC 30 can be folded up and compactly stowed in a case with a volume of only 1.8 cu. ft.

The FRHC 30 has a rugged structural design that is necessary for the rigorous demands of space flight. The mechanical stiffness of the device plays a role in establishing the fidelity of feedback forces to the human operator. For example, under a 9.4 lb static test load there was a 0.032 inch deflection at the end of the link 37. This represents a torsional spring constant ($k_t$) about the axis of the joint 43 of more than 1970 in-lbs/deg. This torsional spring constant may be used to provide an initial estimate of the structural resonant frequency about the axis of the joint 43 of over 21 Hz.

Frequency response tests indicate natural frequency values for the FRHC 30, within the following ranges: joint 42 at 27–29 Hz, joint 43 at 27–33 Hz, and joint 44 at 37–40 Hz. These natural frequency values are approximately two to three times higher than those found in previous hand controller designs.

The FRHC 30 is an intuitive, highly versatile, human interface to complex multi-degree-of-freedom dynamic machines. As a position input device with force output capabilities, the FRHC 30 is the fundamental and natural interface a human operator needs to manipulate multi-dimensional spatial relationships where force cues can help associate a coordinated response. As such, the FRHC 30 has utility as a useful man/machine interface in applications other than the control of teleoperated robotic arms.

The FRHC 30 according to the present invention may have application in several technologies. For example, the FRHC 30 may be used to control the movements of underwater robots for locating and investigating objects on deep ocean bottoms. These submersible robots can travel in three directions (forward/backward, up/down and side to side) and rotate about three axes (roll, pitch and yaw). Presently several joysticks are necessary to pilot these submersible robots, whereas a single force reflecting hand controller 30 can perform several motions simultaneously. Using the force reflecting hand controller 30 instead of joysticks could greatly increase the ease and precision with which such machines may be commanded. For example, an underwater robot could be moved forward and up and rotated all at the same time.

Use of the force reflecting hand controller 30 could simplify the operation of a helicopter. Currently a pilot must use both hands and both feet to fly a helicopter. These complex maneuvers require great skill and coordination. The force reflecting hand controller 30 provides a complete flight control input device that would allow a pilot to fly a helicopter with only one hand.

Another use of the force reflecting hand controller 30 is in computer graphics applications. Advanced computer graphics software now permits the creation of three dimensional objects that may be manipulated relative to the point of view of the user and relative to other objects. The user can zoom in, zoom out, move the objects up and down or from side to side. It is also possible to reorient the roll, pitch and yaw axes of an object displayed on a computer video monitor. Several new input devices have been developed to make this type of object manipulation less cumbersome, but these devices are limited to two or three dimensions at a time instead of providing the six degree of freedom control required to position and orient an object in three dimensional space.

The force reflecting hand controller 30 may be interfaced with a computer to allow a user to move and orient graphic images as easily and intuitively as if the user had actually manually manipulated the objects that the images represent. The capability of the force reflecting hand controller 30 to provide force feedback would enable a user to manually sense contact between objects being manipulated on a screen. This capability could greatly enhance the sensory bandwidth of human interface with graphics work stations.

Still other applications of the force reflecting hand controller 30 are in the nuclear industry and controlling remotely piloted vehicles.

The geometry and kinematics of the force reflecting hand controller 30 and a teleoperator that it is used to control need not be identical. The positional control relationship between the force reflecting hand controller 30 and the teleoperator must be established through mathematical transformation of joint variables measured at both the force reflecting hand controller 30 and the teleoperator in real time. Forces and torques sensed at the mechanical hand of the teleoperator must be resolved into appropriate joint drive signals for the force reflecting hand controller 30 through mathematical transformations in real time to give the operator's hand a force/torque sensation that corresponds to the same forces and torques sensed at the mechanical hand. The particular mathematical transformations between the handgrip and the mechanical hand depend on the structural details of the teleoperator and can be done by those skilled in the art. For example, Bejczy and Salisbury, *Controlling Remote Manipulators Through Kinesthetic Coupling*, Computers in Mechanical Engineering, July, 1983, pp. 51–60 describe the mathematical transformation between a previous force reflecting hand controller and a particular mechanical arm.

The structures and methods disclosed herein illustrate the principles of the present invention. The invention may be embodied in other specific forms without departing from its spirit or essential characteristics. Therefore, the described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A universal hand controller device for interfacing a human operator with a slave machine such as a robot comprising:

a base;

a plurality of serially connected mechanical links extending from the base, the mechanical links being arranged into a first group of first, second, and third linear position links and a second group of first, second, and third angular position links;

a handgrip connected to the serially connected mechanical links distal from the base such that a human operator may grasp the handgrip and control the position of the handgrip relative to the base through the serially connected mechanical links;

a plurality of rotary joints arranged to connect the mechanical links together to provide at least three translational degrees of freedom and at least three rotational degrees of freedom of motion of the handgrip relative to the base, there being one rotary joint corresponding to each degree of freedom, each rotary joint having a drive mechanism comprising a drive motor, a drive pulley assembly and a drive cable connected between the drive motor and the drive pulley assembly such that each joint is cable driven;

means for mounting the drive motors for driving the rotary joints corresponding to the rotational degrees of freedom to one of the linear position links such that the drive cables in the drive mechanisms for the rotary joints corresponding to the rotational degrees of freedom pass through at least one rotary joint corresponding to the linear position link upon which the drive motors for driving the rotary joints are mounted; and means for guiding the drive cable for the first, second, and third angular position links parallel to an axis of rotation of a third of the rotary joints.

2. The universal hand controller device of claim 1 additionally comprising means for guiding the drive cable for the second and third angular position links along an axis of rotation of a fourth of the rotary joints.

3. The universal hand controller device of claim 2 additionally comprising means for guiding the drive cable for the third angular position link along an axis of rotation of a fifth of the rotary joints, wherein the drive mechanism for each rotary joint is kinematically decoupled from all of the other rotary joints such that motion of the handgrip about any selected joint causes no motion of the handgrip relative to any of the other joints.

4. The universal hand controller device of claim 3 wherein rotation of the third linear position link about the third joint causes a uniform twist in the cables for the fourth, fifth, and a sixth of the joints.

5. The universal hand controller device of claim 4 wherein the motors for driving the third, fourth, fifth, and sixth joints are remotely located from the corresponding rotary joints and wherein the drive cables for each rotary joint have constant length as rotation occurs about any of the rotary joints.

6. A universal hand controller device for interfacing a human operator with a slave machine such as a robot, comprising:

a base;

a plurality of serially connected mechanical links extending from the base, the mechanical links being arranged into a first group of linear position links and a second group of angular position links;

a handgrip connected to the third angular position link distal from the base such that a human operator may grasp the handgrip and control the position thereof relative to the base through the serially connected mechanical links;

a plurality of rotary joints arranged to connect the mechanical links together to provide three translational degrees of freedom and three rotational degrees of freedom of motion of the handgrip relative to the base, there being one rotary joint corresponding to each degree of freedom, each rotary joint having a drive mechanism comprising a corresponding a motor, a drive pulley assembly, and a drive cable connected between the motor and drive pulley assembly such that each joint is cable driven; the mechanical links and rotary joints including a first linear position link rotatably mounted to the base by a first one of the plurality of rotary joints;

a second linear position link rotatably mounted to the first linear position link by a second one of the plurality of rotary joints;

a third linear position link rotatably mounted to the second linear position link by a third one of the plurality of rotary joints;

a first angular position link rotatably mounted to the third linear position link by a fourth one of the plurality of rotary joints;

a second angular position link rotatably mounted to the first angular position link by a fifth one of the plurality of rotary joints;

a third angular position link rotatably mounted to the second angular position link by a sixth one of the plurality of rotary joints, the first, second, and third angular position links being arranged to have axes of rotation that intersect at a point that is fixed with respect to the third linear position link; and means for mounting the drive motors for driving the fourth, fifth, and sixth rotary joints to the third linear position link such that the drive cables in the drive mechanisms for the fourth, fifth, and sixth rotary joints pass through the axis of rotation of the third rotary joint;

wherein the drive cable for the first, second, and third angular position links are parallel to the axis of rotation of the third rotary joint, the drive cable for the second and third angular position links are guided along the axis of rotation of the fourth rotary joint, and the drive cable for the third angular position link is guided along the axis of rotation of the fifth rotary joint, so that the drive mechanism for each rotary joint is kinematically decoupled from all of the other rotary joints such that motion of the handgrip about any selected joint causes no motion of the handgrip relative to any of the other joints.

* * * * *